UNITED STATES PATENT OFFICE.

DAVID MÜLLER, OF KRAKOW, AUSTRIA-HUNGARY, ASSIGNOR OF ONE-THIRD TO ADOLF MEISELS AND ONE-THIRD TO JOSEF GOTTLIEB, OF KRAKOW, AUSTRIA-HUNGARY.

PROCESS OF MANUFACTURING AN IMPROVED EDIBLE FAT.

964,674. Specification of Letters Patent. Patented July 19, 1910.

No Drawing. Application filed July 20, 1906. Serial No. 327,062.

*To all whom it may concern:*

Be it known that I, DAVID MÜLLER, official, subject of the Emperor of Austria-Hungary, residing in Krakow, Iasnagasse 8, Austria-Hungary, have invented a Process of Manufacturing an Improved Edible Fat; and I do hereby declare the following to be a full, clear, and exact description of the invention, such as will enable others skilled in the art to which it appertains to make and use the same.

This invention relates to a process for the manufacture of improved edible fat from any neutral fat (for instance, cocoanut fat, margarin fat, mafura tallow, etc.) or from a mixture of such fats, by means of which there may be obtained, in a cheap and simple manner, a product which is entirely equivalent to natural butter both in respect of appearance and taste, as well as suitability for consumption.

The process of this invention is based on the fact that those substances (in particular acids, volatile acids, and casein) which impart to natural butter its taste and odor, are added to the fat at a high temperature directly from the residual matters that are produced in the manufacture of natural cheese, whereby, on the one hand, the cost of production of the improved edible fat is considerably diminished by the direct extraction of the aforesaid substances from a natural product, while, on the other hand, by increasing the temperature it is rendered possible to add the contents or percentage of said substances to the fat employed, in a proportion corresponding to the proportion found in natural butter.

For the purpose of carrying out this process, a suitable neutral fat (for instance, cocoanut fat, margarin fat, mafura tallow etc.) is mixed at a temperature of about 40-50 degrees Celsius in the whey which remains over in the manufacture of natural cheese (for example, in a double-walled or water-jacketed vessel) and is maintained at this temperature for a suitable period. By this treatment the fat extracts from the whey those constituents which impart to natural butter its peculiar taste and smell, and particularly the volatile organic acids and the casein which are still contained to a considerable extent in the whey, the fat which is still contained in the whey being also removed. This boiling or cooking operation is continued until the surface of the mixture is closely covered with a flaky or curdy layer.

Before the termination of the boiling operation there may also be added to the boiling mass ordinary or pasteurized sweet or sour milk or similar kinds of sweet or sour cream or butter-milk (according to the quality of the butter to be produced), for the purpose of increasing the percentage of the casein and fatty acids in the product which impart to the mixture the taste and smell of natural butter. Moreover at this stage a suitable coloring matter may be added.

When the boiling process is completed, the fat is separated from the whey, which may be done, for example, by allowing the whey to flow out of the vessel, while the collected fats, enriched with the volatile acids and the casein of which the aforesaid flaky or curdy layer is mainly composed, are introduced into a mixing machine in which they are allowed to cool slowly. After this has taken place the mixing apparatus is set in motion until the fat has become set. In some cases, if necessary, after the fat has become set, there may also be added to it ordinary or pasteurized sweet or sour cream, or milk, or whey, or butter-milk, and in some cases also artificial butter-stuffs (for instance, butyric, caproic-aldehyde etc.); after which the mixing operation is continued for a further period. After the completion of the mixing operation, the product is removed from the mixing machine and treated in the same manner as natural butter by salting, working or kneading, and washing.

Having now particularly described and ascertained the nature of the said invention and in what manner the same is to be performed, I declare that what I claim is—

1. The process of manufacturing artificial butter which consists in mixing a neutral fat with whey heated to a temperature of at least 40° C. and in maintaining said temperature until a curdy or flaky layer forms on the mixture, then removing the whey, leaving the curdy or flaky layer on the remaining portion of the mixture, and then mixing said remaining portion of the mixture, substantially as described.

2. The process of manufacturing artificial butter which consists in mixing a neutral fat with whey heated to a temperature of at least 40° C., and in maintaining the temperature until a curdy or flaky layer forms on the mixture, and, while said temperature is being maintained, introducing milk into the mixture, then removing the whey, leaving the curdy or flaky layer on the remaining portion of the mixture, and then mixing said remaining portion of the mixture, substantially as described.

3. The process of manufacturing butter which consists in mixing a neutral fat with whey heated to a temperature of at least 40° C. and maintaining said temperature until a curdy or flaky layer forms on the mixture, then removing the whey, leaving the curdy or flaky layer on the remaining portion of the mixture thereupon introducing the remaining portion of the mixture into a mixing apparatus and allowing it to slowly cool, and thereupon agitating said remaining portion of the mixture in said apparatus until it sets, substantially as described.

In testimony, that I claim the foregoing, I have hereunto set my hand this 5th day of July, 1906.

DAVID MÜLLER.

Witnesses:
JOSEF GOLTZ,
ADOLF MEISER.